(12) United States Patent
Kawalkar

(10) Patent No.: US 8,766,936 B2
(45) Date of Patent: Jul. 1, 2014

(54) TOUCH SCREEN AND METHOD FOR PROVIDING STABLE TOUCHES

(75) Inventor: Amit Nishikant Kawalkar, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 529 days.

(21) Appl. No.: 13/162,679

(22) Filed: Jun. 17, 2011

(65) Prior Publication Data

US 2012/0242591 A1    Sep. 27, 2012

Related U.S. Application Data

(60) Provisional application No. 61/467,752, filed on Mar. 25, 2011.

(51) Int. Cl.
*G09G 5/00*    (2006.01)
*G06F 3/01*    (2006.01)
*G06F 3/0488*    (2013.01)

(52) U.S. Cl.
CPC ............ *G06F 3/04886* (2013.01); *G06F 3/013* (2013.01)
USPC .......................................................... 345/173

(58) Field of Classification Search
CPC ....... G06F 3/013; G06F 3/041; G06F 3/0488; G06F 3/04842
USPC ................................................ 345/173, 174
See application file for complete search history.

(56) References Cited

U.S. PATENT DOCUMENTS

| | | |
|---|---|---|
| 5,128,672 A | 7/1992 | Kaehler |
| 5,689,619 A | 11/1997 | Smyth |
| 5,764,222 A | 6/1998 | Shieh |
| 5,870,083 A | 2/1999 | Shieh |
| 5,956,020 A | 9/1999 | D'Amico et al. |
| 6,160,536 A | 12/2000 | Forest |
| 6,181,328 B1 | 1/2001 | Shieh et al. |
| 6,459,424 B1 | 10/2002 | Resman |
| 6,636,897 B1 | 10/2003 | Sherman et al. |
| 6,831,631 B2 | 12/2004 | Chuang |
| 7,176,902 B2 | 2/2007 | Peterson, Jr. et al. |
| 7,289,102 B2 | 10/2007 | Hinckley et al. |

(Continued)

FOREIGN PATENT DOCUMENTS

WO    2010040207 A1    4/2010

OTHER PUBLICATIONS

Kawalkar, A. N., et al.: "System and Method for Interacting With a Touch Screen Interface Utilizing an Intelligent Stencil Mask" filed with the USPTO on and assigned U.S. Appl. No. 13/708,320, filed Dec. 7, 2012.

(Continued)

*Primary Examiner* — Regina Liang
(74) *Attorney, Agent, or Firm* — Ingrassia Fisher & Lorenz, P.C.

(57) ABSTRACT

A system and method are provided for a touch screen whose input is less influenced by turbulence, G forces, and/or equipment vibrations. A method of selecting one of a plurality of buttons displayed on a touch screen includes preventing buttons within a first portion of the touch screen from registering a touch; placing a portion of a hand on the first portion; and touching one of the plurality of buttons on a second portion of the touch screen.

21 Claims, 17 Drawing Sheets

(56) References Cited

U.S. PATENT DOCUMENTS

| | | |
|---|---|---|
| 7,295,191 B2 | 11/2007 | Kraus et al. |
| 7,411,575 B2 | 8/2008 | Hill et al. |
| 7,489,303 B1 | 2/2009 | Pryor |
| 7,561,143 B1 | 7/2009 | Milekie |
| 7,693,869 B2 | 4/2010 | Hutson et al. |
| 7,730,401 B2 | 6/2010 | Gillespie et al. |
| 7,782,307 B2 | 8/2010 | Westerman et al. |
| 7,834,855 B2 | 11/2010 | Hotelling et al. |
| 7,847,789 B2 | 12/2010 | Kolmykov-Zotov et al. |
| 7,895,522 B2 | 2/2011 | Wong et al. |
| 8,018,440 B2 | 9/2011 | Townsend et al. |
| 8,085,252 B1 | 12/2011 | Lee et al. |
| 8,136,053 B1 | 3/2012 | Miller et al. |
| 2004/0150626 A1 | 8/2004 | Husman et al. |
| 2004/0212601 A1 | 10/2004 | Cake et al. |
| 2005/0243054 A1 | 11/2005 | Beymer et al. |
| 2006/0161871 A1 | 7/2006 | Hotelling et al. |
| 2006/0221061 A1 | 10/2006 | Fry |
| 2006/0279548 A1 | 12/2006 | Geaghan |
| 2007/0152976 A1 | 7/2007 | Townsend et al. |
| 2007/0268269 A1 | 11/2007 | Chang et al. |
| 2007/0273671 A1 | 11/2007 | Zadesky et al. |
| 2008/0042988 A1 | 2/2008 | Westerman et al. |
| 2008/0100586 A1 | 5/2008 | Smart |
| 2008/0158146 A1 | 7/2008 | Westerman |
| 2008/0165154 A1 | 7/2008 | Kim |
| 2008/0284739 A1 | 11/2008 | Andrews et al. |
| 2009/0058819 A1 | 3/2009 | Gioscia et al. |
| 2009/0082107 A1 | 3/2009 | Tahara et al. |
| 2009/0085894 A1 | 4/2009 | Gandhi et al. |
| 2009/0156363 A1 | 6/2009 | Guidi et al. |
| 2009/0174676 A1 | 7/2009 | Westerman |
| 2009/0174679 A1 | 7/2009 | Westerman |
| 2009/0244032 A1 | 10/2009 | Westerman et al. |
| 2009/0251432 A1 | 10/2009 | Wang et al. |
| 2009/0262089 A1 | 10/2009 | Wang |
| 2009/0273571 A1 | 11/2009 | Bowens |
| 2009/0296988 A1 | 12/2009 | Yamazaki et al. |
| 2009/0322683 A1 | 12/2009 | Tsuji et al. |
| 2009/0322687 A1 | 12/2009 | Duncan et al. |
| 2010/0020038 A1 | 1/2010 | Vogel et al. |
| 2010/0053095 A1 | 3/2010 | Wu et al. |
| 2010/0115473 A1 | 5/2010 | Reeves et al. |
| 2010/0127995 A1 | 5/2010 | Rigazio et al. |
| 2010/0146459 A1 | 6/2010 | Repka |
| 2010/0146463 A1 | 6/2010 | Cho et al. |
| 2010/0149130 A1 | 6/2010 | Jung et al. |
| 2010/0156795 A1 | 6/2010 | Kim et al. |
| 2010/0169766 A1 | 7/2010 | Duarte et al. |
| 2010/0188371 A1 | 7/2010 | Lowles et al. |
| 2010/0194713 A1 | 8/2010 | Kawashima et al. |
| 2010/0207894 A1 | 8/2010 | Tsuei |
| 2010/0245258 A1 | 9/2010 | Stewart et al. |
| 2010/0269040 A1 | 10/2010 | Lee |
| 2010/0273533 A1 | 10/2010 | Cho |
| 2010/0289759 A1 | 11/2010 | Fisher et al. |
| 2010/0289768 A1 | 11/2010 | Nakao |
| 2010/0315267 A1 | 12/2010 | Chung et al. |
| 2010/0315371 A1* | 12/2010 | Katsu et al. .................. 345/173 |
| 2011/0006996 A1 | 1/2011 | Smith et al. |
| 2011/0012855 A1 | 1/2011 | Yeh et al. |
| 2011/0037705 A1 | 2/2011 | Yilmaz |
| 2011/0074544 A1 | 3/2011 | D'Souza |
| 2011/0090169 A1 | 4/2011 | Karhiniemi |
| 2011/0175932 A1 | 7/2011 | Yu et al. |
| 2011/0187651 A1 | 8/2011 | Whitlow et al. |
| 2011/0187661 A1* | 8/2011 | Wakizaka et al. ............. 345/173 |
| 2011/0199327 A1 | 8/2011 | Shin et al. |
| 2011/0210926 A1 | 9/2011 | Pasquero et al. |
| 2011/0214162 A1 | 9/2011 | Brakensiek et al. |
| 2011/0227872 A1 | 9/2011 | Huska et al. |
| 2011/0254798 A1 | 10/2011 | Adamson et al. |
| 2011/0271216 A1 | 11/2011 | Wilson |
| 2011/0285645 A1 | 11/2011 | Cho et al. |
| 2011/0291944 A1 | 12/2011 | Simmons et al. |
| 2011/0291948 A1 | 12/2011 | Stewart et al. |
| 2011/0291985 A1 | 12/2011 | Wakako et al. |
| 2011/0310001 A1 | 12/2011 | Madau et al. |
| 2011/0316807 A1 | 12/2011 | Corrion |
| 2012/0011438 A1* | 1/2012 | Kim et al. ..................... 345/173 |
| 2012/0013570 A1 | 1/2012 | Murata |
| 2012/0022720 A1 | 1/2012 | Deleris et al. |
| 2012/0036445 A1 | 2/2012 | Ganille et al. |
| 2012/0105486 A1 | 5/2012 | Lankford et al. |
| 2012/0154293 A1 | 6/2012 | Hinckley et al. |
| 2012/0254808 A1 | 10/2012 | Gilfind |
| 2013/0113719 A1 | 5/2013 | Griffin et al. |

OTHER PUBLICATIONS

USPTO Office Action for U.S. Appl. No. 13/427,336 dated Oct. 25, 2013.

Himberg J., et al.; On-line Personalization of a Touch Screen Based Keyboard.

Simpson, R., et al.; Research in Computer Access Assessment and Intervention, NIH Public Access Author Manuscript, Phys Med Rehabil Clin N Am. Feb. 2010; 21(1): 15-32. doi:10.1016/j.pmr2009.07.006.

Kawalkar, A. N.: Touch Screen Display User Interface and Method for Improving Touch Interface Utility on the same Employing a Rules-Based Masking System, filed with the USPTO on Mar. 22, 2012 and assigned U.S. Appl. No. 13/427,336.

Sukumar, S.: System and Method for Reducing the Effects of Inadvertent Touch on a Touch Screen Controller, filed with the USPTO on Aug. 7, 2012 and assigned U.S. Appl. No. 13/568,959.

Kawalkar A. N.: System and Method for Reducing the Probability of Accidental Activation of Control Functions on a Touch Screen, filed with the USPTO on Aug. 28, 2012 and assigned U.S. Appl. No. 13/597,021.

* cited by examiner

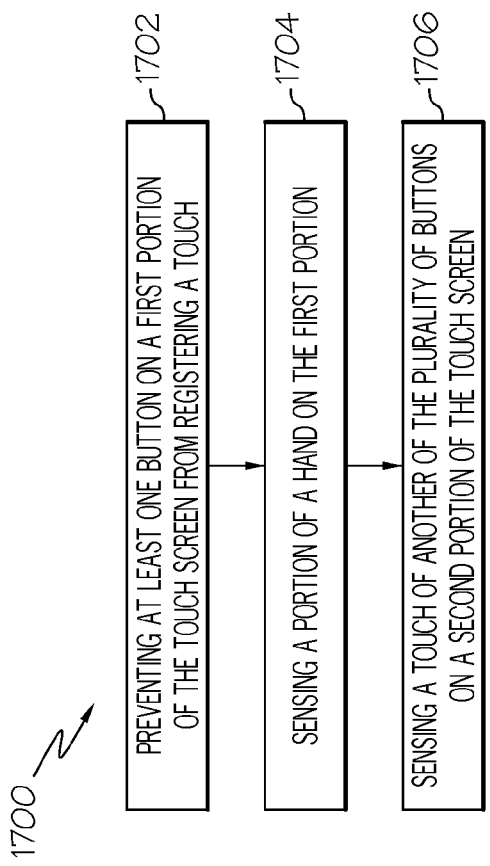
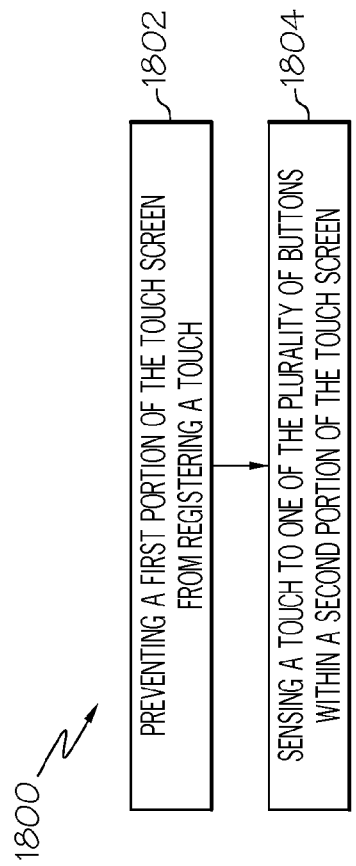

TOUCH SCREEN AND METHOD FOR
PROVIDING STABLE TOUCHES

This application claims the benefit of U.S. Provisional Application No. 61/467,752 filed 25 Mar. 2011.

TECHNICAL FIELD

The exemplary embodiments described herein generally relate to touch screens and more particularly to a method for providing stable touches to a touch screen.

BACKGROUND

World wide air traffic is projected to double every ten to fourteen years and the International Civil Aviation Organization (ICAO) forecasts world air travel growth of five percent per annum until the year 2020. Such growth may have an influence on flight performance and may increase the workload of the flight crew. One such influence on flight performance has been the ability for the flight crew to input data while paying attention to other matters within and outside of the cockpit, especially during periods when movement makes it difficult to touch the panel in the desired manner or location. The ability to easily and quickly input data can significantly improve situational awareness of the flight crew.

Many electronic devices, such as aircraft flight deck operational equipment, cursor control devices (CCDs), hard knobs, switches, and hardware keyboards, are increasingly being replaced by touch panels. A touch panel offers intuitive input for a computer or other data processing devices, but may be affected by movement of the touch panel and/or the pilot caused by, for example, turbulence, aircraft vibration, and/or G forces.

Accordingly, it is desirable to provide a touch screen whose input is less subject to the movement turbulence, G forces, and/or equipment vibrations. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for a touch screen whose input is less subject to the movement turbulence, G forces, and/or equipment vibrations.

In an exemplary embodiment, a method of selecting one of a plurality of buttons displayed on a touch screen includes preventing at least one button on a first portion of the touch screen from registering a touch; sensing a portion of a hand on the first portion; and sensing a touch on another of the plurality of buttons on a second portion of the touch screen.

In another exemplary embodiment, a method of selecting one of a plurality of buttons displayed on a touch screen includes preventing a first portion of the touch screen from registering a touch, and sensing a touch to one of the plurality of buttons within a second portion of the touch screen.

In yet another exemplary embodiment, a touch screen includes a display screen; first circuitry configured to display at least one character through the display screen on each of a plurality of buttons; second circuitry configured to sense touches applied to each of the plurality of buttons; and a processor configured to define a region in which a touch to at least a portion of an underlying button will be ignored.

BRIEF DESCRIPTION OF THE DRAWINGS

The present invention will hereinafter be described in conjunction with the following drawing figures, wherein like numerals denote like elements.

FIG. 17 is a flow chart of a first method in accordance with the exemplary embodiments; and FIG. 18 is a flow chart of a second method in accordance with the exemplary embodiments.

DETAILED DESCRIPTION

Figure 1:
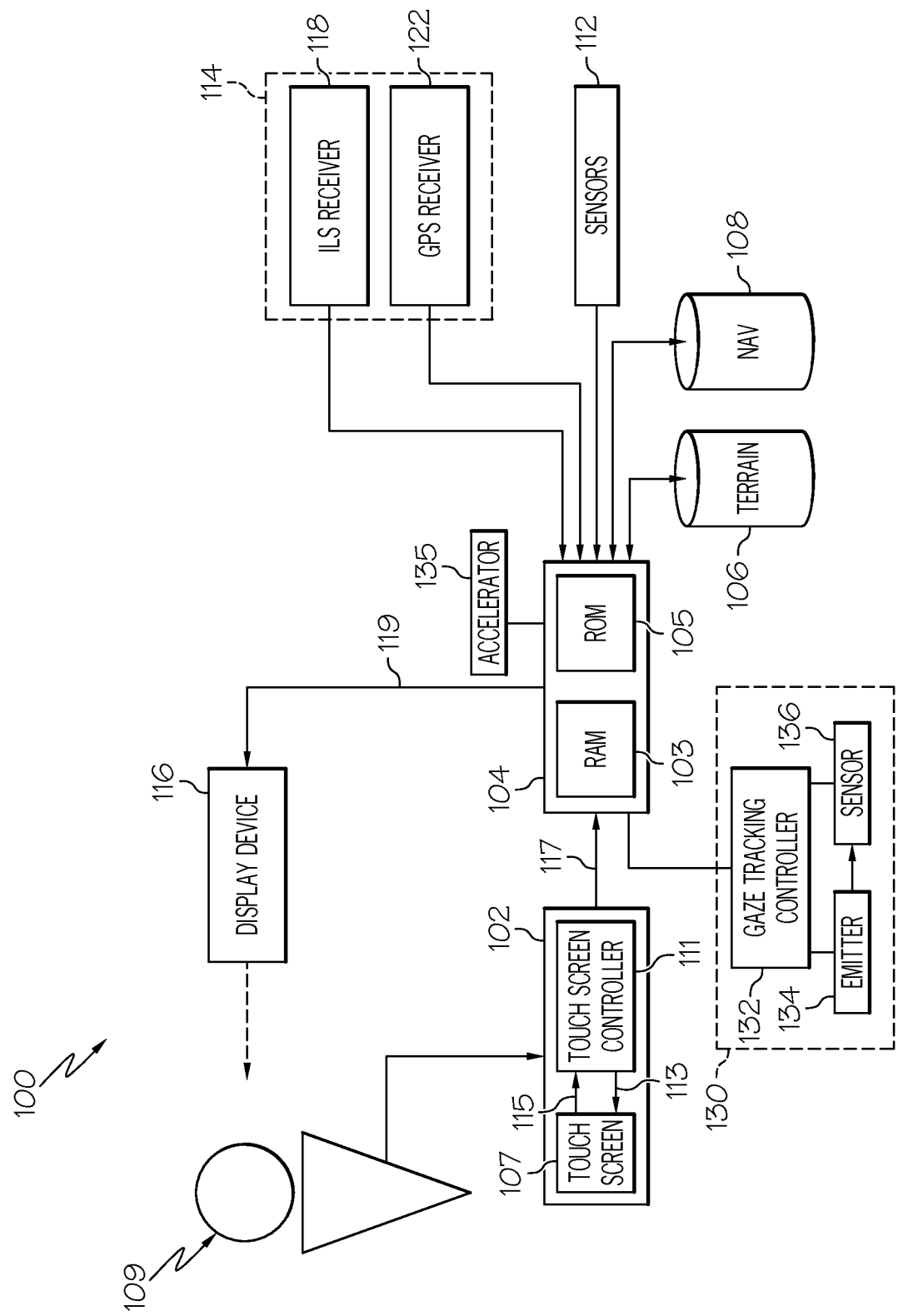
FIG. 1 is a block diagram of an aircraft system including a touch screen display.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

A system and method are provided for stabilizing the hand of a user for the touching of interactive graphical items on a touch screen. The system comprises first circuitry configured to display at least one character through the display screen on each of a plurality of buttons, and second circuitry configured to sense touches applied to each of the plurality of buttons. A processor defines a region that is configured to ignore touches to a portion of the touch screen (prevents touches from being registered by underlying touch sensitive regions), which may include a portion of or all of one or more of the plurality of buttons. In unstable operating environments, for example, turbulence, it is likely that the user's accuracy will be reduced and touch locations may miss the desired interactive graphical item rather than being on target as they would be under calm conditions or in stable operating environments. Placing a portion of the user's hand on the touch screen will stabilize the touching of the interactive graphical item so as to improve the user's chance of hitting the target.

A first exemplary embodiment includes strategically placing two or more regions around the interactive graphical items, e.g., buttons. A portion of a hand is placed on one of the regions and a digit of the hand touches the desired button.

A second exemplary embodiment comprises a larger shaped region in which a palm of a hand may be rested. A third exemplary embodiment has a target button identified by the gaze of the user, and a region strategically placed nearby. A fourth exemplary embodiment has a touch sensitive area identified by a gaze, with the remainder of the touch screen being non-sensitive to a touch.

A fifth exemplary embodiment includes a viewport around a sensitive area, wherein the area around the viewport is non-sensitive. The viewport is sensitive to touch and may be sized and moved. A sixth exemplary embodiment designates a plurality of touch points derived from the placement of a hand on the touch screen to define a area that may be moved and sized with movement of the hand. A seventh exemplary embodiment determines areas sensed from the placement of a hand on the touch screen, and determines a region by combining the areas and the area therebetween. An eighth exemplary embodiment determines a region from a gesture made by the user.

Each of the regions in the above described embodiments may be dragged to a better position for the touching of the button, and a button, or a portion thereof, beneath the regions may be viewed, but a touch thereto will be ignored.

Though the method and touch screen of the exemplary embodiments may be used in any type of electronic device, for example, vehicles and heavy machinery, and small handheld mobile devices such as smart phones, the use in an aircraft system is described as an example. Referring to FIG. 1, a flight deck display system 100 includes a user interface 102, a processor 104, one or more terrain databases 106 sometimes referred to as a Terrain Avoidance and Warning System (TAWS), one or more navigation databases 108, sensors 112, external data sources 114, and one or more display devices 116. The user interface 102 is in operable communication with the processor 104 and is configured to receive input from a user 109 (e.g., a pilot) and, in response to the user input, supplies command signals to the processor 104. The user interface 102 may be any one, or combination, of various known user interface devices including, but not limited to, one or more buttons, switches, or knobs (not shown). In the depicted embodiment, the user interface 102 includes a touch screen 107 and a touch screen controller 111. The touch screen controller 111 provides drive signals 113 to a touch screen 107, and a sense signal 115 is provided from the touch screen 107 to the touch screen controller 111, which periodically provides a controller signal 117 of the determination of a touch to the processor 104. The processor 104 interprets the controller signal 117, determines the application of the digit on the touch screen 107, and provides, for example, a controller signal 117 to the touch screen controller 111 and a signal 119 to the display device 116. Therefore, the user 109 uses the touch screen 107 to provide an input as more fully described hereinafter. Furthermore, in some exemplary embodiments, the flight deck system 100 includes a gaze detecting system 130 comprising a gaze tracking controller 132 coupled between the processor 104 and each of an emitter 134 and a sensor 136, and in other exemplary embodiments, an accelerator 135.

The processor 104 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. In the depicted embodiment, the processor 104 includes on-board RAM (random access memory) 103, and on-board ROM (read-only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. The software executing the exemplary embodiment is stored in either the ROM 105 or the RAM 103. It will be appreciated that this is merely exemplary of one scheme for storing operating system software and software routines, and that various other storage schemes may be implemented.

The memory 103, 105 may be realized as RAM memory, flash memory, EPROM memory, EEPROM memory, registers, a hard disk, a removable disk, a CD-ROM, or any other form of storage medium known in the art. In this regard, the memory 103, 105 can be coupled to the processor 104 such that the processor 104 can be read information from, and write information to, the memory 103, 105. In the alternative, the memory 103, 105 may be integral to the processor 104. As an example, the processor 104 and the memory 103, 105 may reside in an ASIC. In practice, a functional or logical module/component of the display system 100 might be realized using program code that is maintained in the memory 103, 105. For example, the memory 103, 105 can be used to store data utilized to support the operation of the display system 100, as will become apparent from the following description.

No matter how the processor 104 is specifically implemented, it is in operable communication with the terrain databases 106, the navigation databases 108, and the display devices 116, and is coupled to receive various types of inertial data from the sensors 112, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display devices 116. The display devices 116, in response to the display commands, selectively render various types of textual, graphic, and/or iconic information.

The terrain databases 106 include various types of data representative of the terrain over which the aircraft is flying, and the navigation databases 108 include various types of navigation-related data. The sensors 112 may be implemented using various types of inertial sensors, systems, and or subsystems, now known or developed in the future, for supplying various types of inertial data, for example, representative of the state of the aircraft including aircraft speed, heading, altitude, and attitude. The ILS 118 provides aircraft with horizontal (or localizer) and vertical (or glide slope) guidance just before and during landing and, at certain fixed points, indicates the distance to the reference point of landing on a particular runway. The GPS receiver 124 is a multi-channel receiver, with each channel tuned to receive one or more of the GPS broadcast signals transmitted by the constellation of GPS satellites (not illustrated) orbiting the earth.

The display devices 116, as noted above, in response to display commands supplied from the processor 104, selectively render various textual, graphic, and/or iconic information, and thereby supplies visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat screen displays such as various types of LCD (liquid crystal display) and TFT (thin film transistor) displays. The display devices 116 may additionally be implemented as a screen mounted display, or any one of numerous known technologies. It is additionally noted that the display devices 116 may be configured as any one of numerous types of aircraft flight deck displays. For example, it may be configured as a multi-function display, a horizontal situation indicator, or a vertical situation indicator, just to name a few. In the depicted embodiment, however, one of the display devices 116 is configured as a primary flight display (PFD).

In operation, the display device 116 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other well known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display device 116 is suitably designed to process data obtained from the sources of flight status data in the manner described in more detail herein.

There are many types of touch screen sensing technologies, including capacitive, resistive, infrared, surface acoustic wave, and embedded optical. All of these technologies sense touches on a screen. For example, U.S. Pat. No. 6,492,979 discloses the use of a combination of capacitive touch screen and force sensors, U.S. Pat. No. 7,196,694 discloses the use of force sensors at the peripherals of the touch screen to determine the position of a touch, and US patent publication 2007/0229464 discloses the use of a capacitive force sensor array, overlaying a display to form a touch screen. While a touch screen is described wherein the application of the touch is determined by a change in resistance, there are many other technologies available that could be used, including Infrared and capacitive.

A touch screen is disclosed having a plurality of buttons, each configured to display one or more symbols. A button as used herein is a defined visible location on the touch screen that encompasses the symbol(s). Symbols as used herein are defined to include alphanumeric characters, icons, signs, words, terms, and phrases, either alone or in combination. A particular symbol is selected by sensing the application (touch) of a digit, such as a finger or a stylus, to a touch-sensitive object associated with that symbol. A touch-sensitive object as used herein is a touch-sensitive location that includes a button and may extend around the button. Each button including a symbol has a touch-sensing object associated therewith for sensing the application of the digit or digits.

Figure 2:
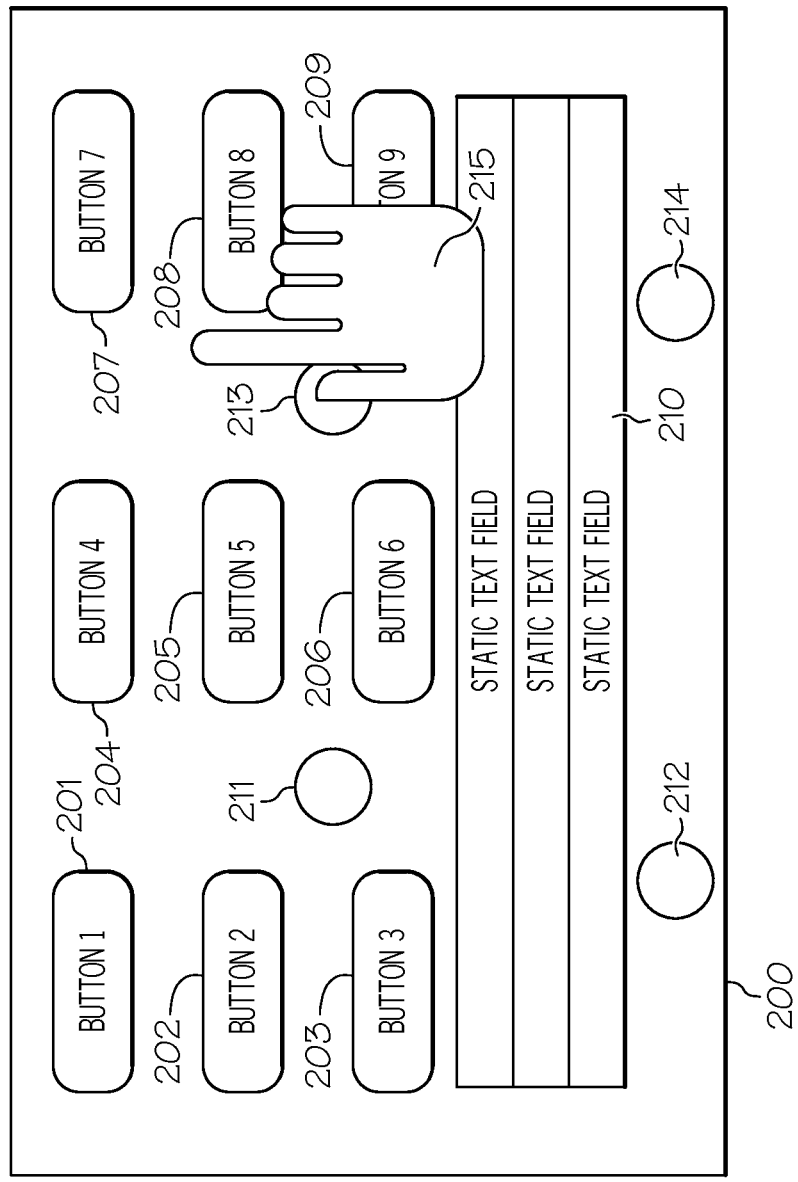
FIGS. 2-4 are frontal views of a touch screen in accordance with a first exemplary embodiment.

Referring to FIG. 2 and in accordance with an exemplary embodiment, a touch screen 200 includes a plurality of buttons 201-209, an optional text field 210, and at least one visible region 211-214 providing physical support to the interacting hand(s) of a user to improve the probability of touching a desired button 201-209 and for reducing fatigue. While four regions 211-214 are shown, any number of at least one may be provided. A user may rest a portion of a hand 215, such as a thumb, on one of the regions 211-214, for example region 213, to steady the hand 215 during a touching of one of the buttons 201-209 during turbulence, vibrations of the display, or the like. The regions 211-214 define an area configured by the processor to ignore touches to that portion of the touch screen (prevents touches from being registered by underlying touch sensitive regions). The location of the regions 211-214 are determined by the location of the buttons 201-209 and the distance required to reach the buttons 201-209, offering maximum accessibility to interactive graphical items (buttons 201-209) with minimum region 211-214 movement.

In one exemplary embodiment, a region 211-214 may be moved by the user touching a region 211-214 and dragging the touch across the screen 200 so as to place a digit over one of the buttons 201-209 without providing any unintended touch commands. For example, referring to FIG. 3, the user has touched the region 213 (represented by the dotted region 213 in FIG. 3) and moved the region 213 up and to the left towards the desired button 204 (the region 213 being moved is numbered 213' and may be enlarged while being moved). When the moving region 213' is in a position where the user may easily touch the desired button 306, the user stops moving the region 213'. When the movement ceases, the region 213' assumes its original shape as region 213" (FIG. 4). When a region 211-214 overlies a button 201-209, such as region 213', 213" overlying button 205, that portion of the button 205 will not register a touch. Furthermore, the region 213' 213" is semi-transparent, allowing the user to see the button beneath the region 213', 213". The borders of the regions 211-214 are visible for the user to quickly perceive its geometry and available area to support an interacting hand. Furthermore, the border can be animated, for example, moving dashes, for easy recognition. Additionally, the regions 211-214 may be made available, for example, when the touch screen is displaying, when the user selects the option, or during unstable environments, for example, turbulence or vibrations as sensed by the accelerator 135 (FIG. 1).

Figure 3:
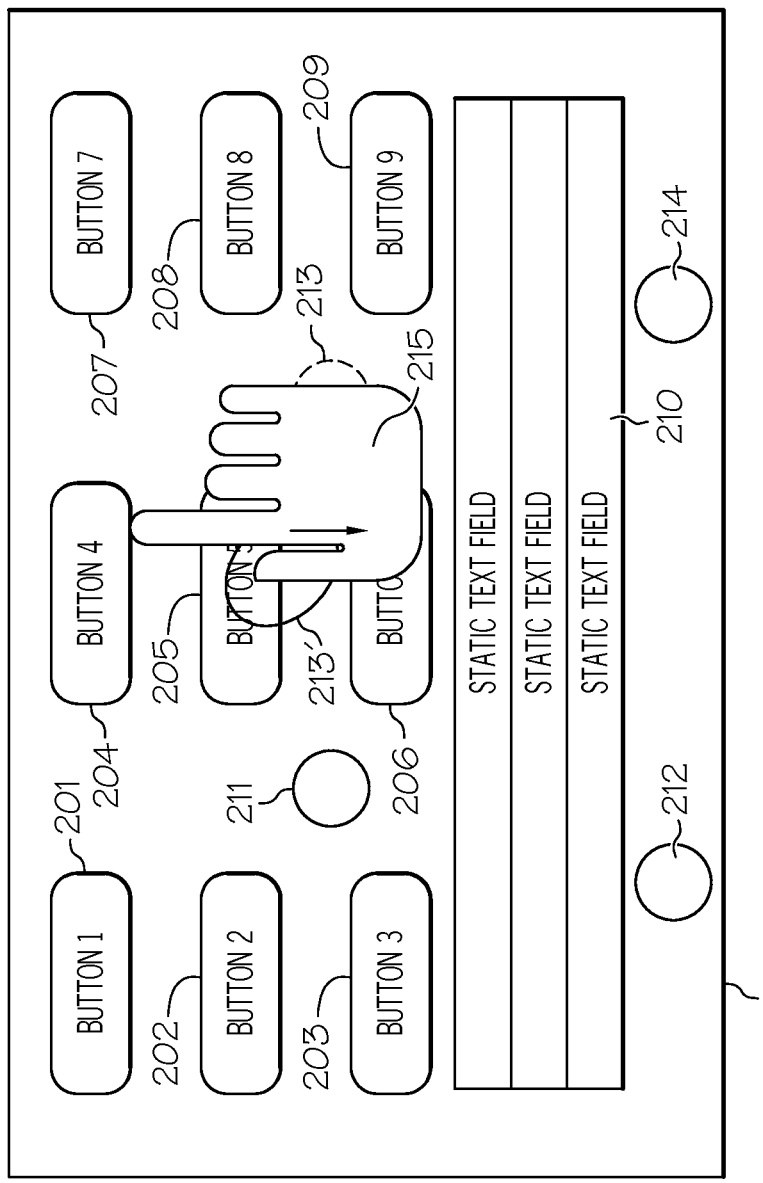
Figure 4:
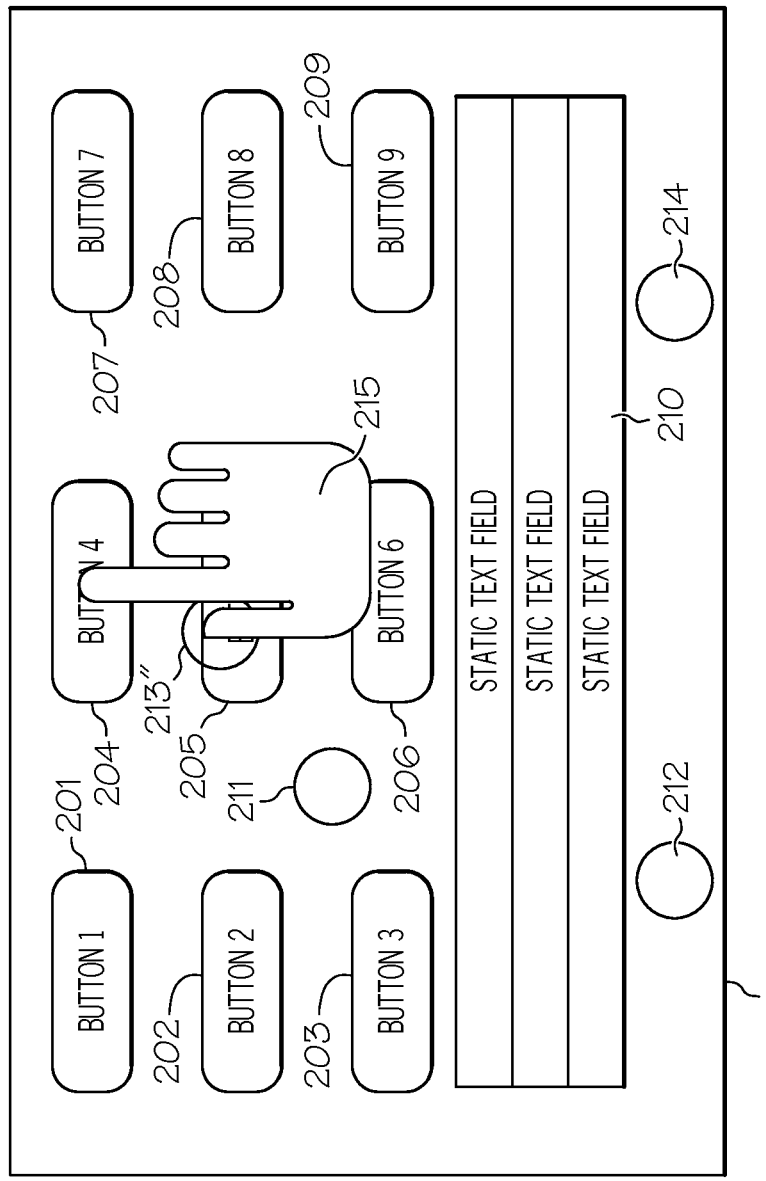

While the regions 211-214 are located in the lower half of the touch screen 200 in FIGS. 2-4, they may be located anywhere on the touch screen 200. Preferably, the non-sensitive regions 211-214 are strategically located in consideration of the location of the buttons 201-209 and in consideration of the shape of a user's hand 215.

Figure 5:
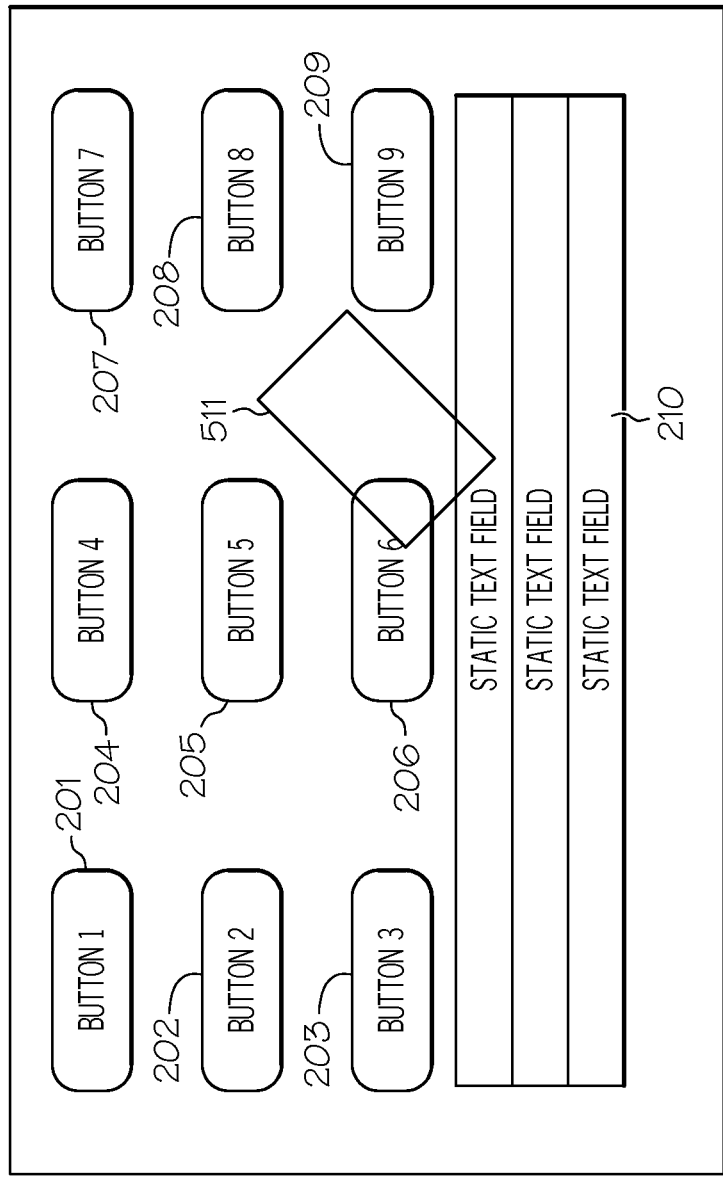
FIGS. 5-6 are frontal views of a touch screen in accordance with a second exemplary embodiment.
Figure 6:
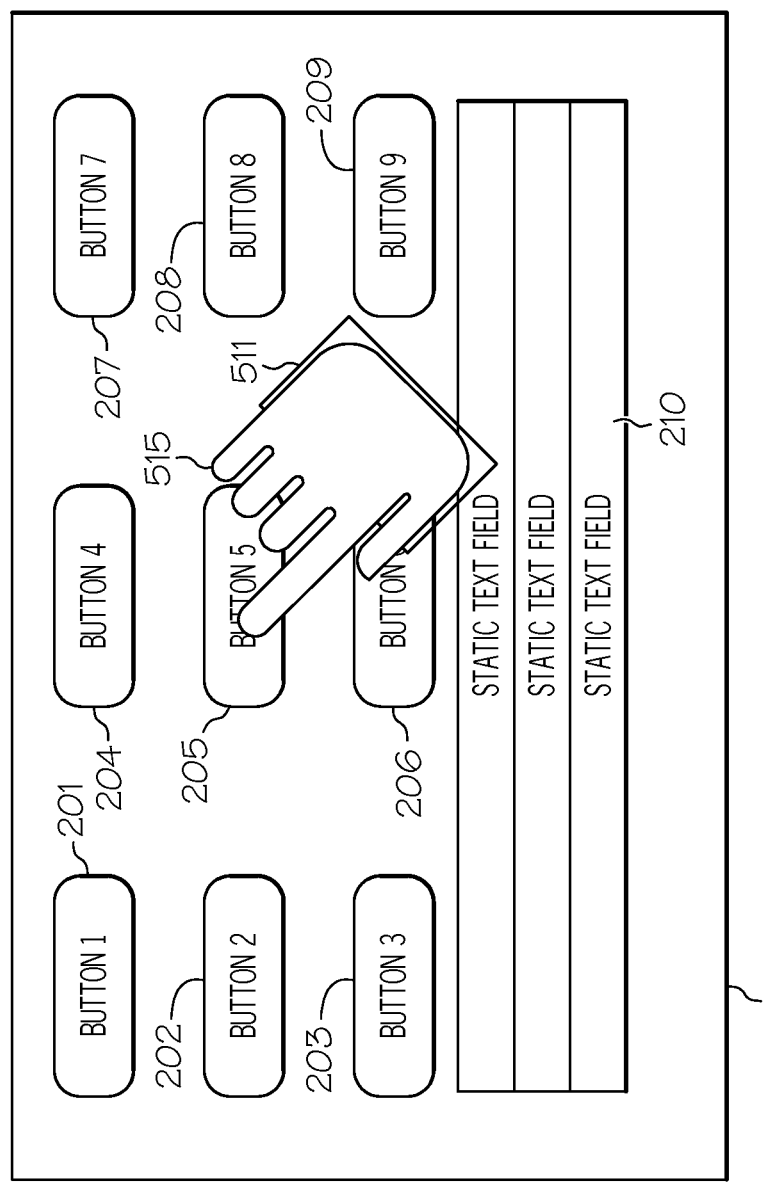

Furthermore, the regions 211-214 may assume any predetermined size and shape, which may be determined at software design or during runtime for the most appropriate use for the given usage context. For example, referring to FIG. 5, a touch screen 500 includes a region 511 having a rectangular shape of a size large enough to receive a palm of a hand 515, which may be more suitable for a large touch screen. The region 511 may be drug towards button 205, for example, so the user may touch the button 204 with a finger (FIG. 6). As in the previous embodiment, when the region 511 overlies a button 201-209, such as region 511 overlying button 206, that portion of the button 206 will not register a touch. Furthermore, the region 511 is semi-transparent, allowing the user to see the button beneath the region 511.

Figure 7:
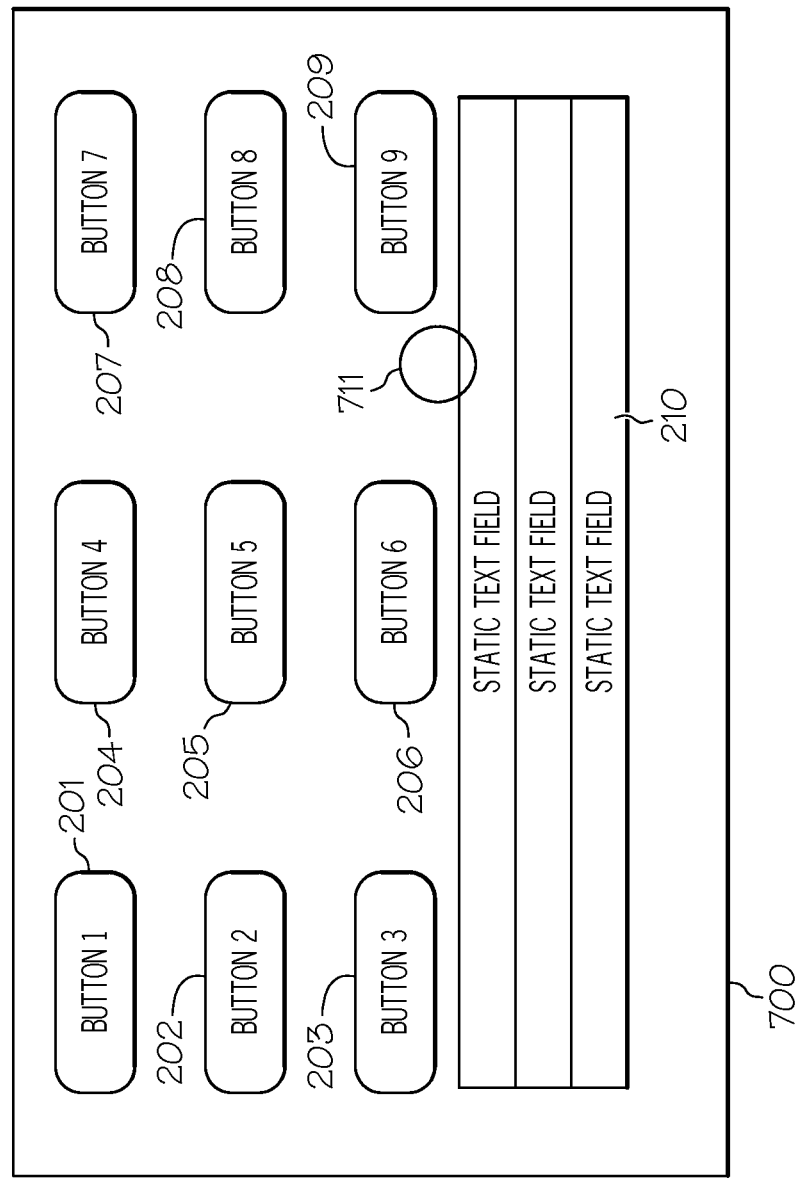
FIGS. 7-8 are frontal views of a touch screen in accordance with a third exemplary embodiment.
Figure 8:
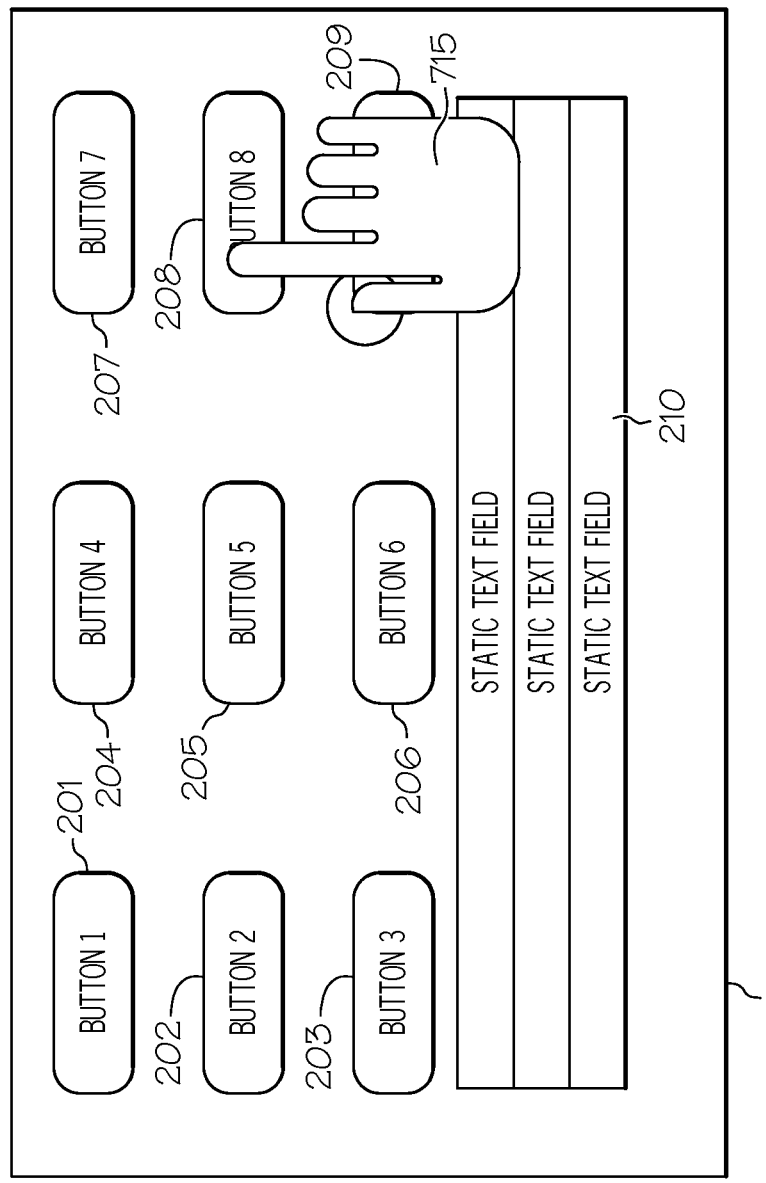

In the following described embodiment, the direction of a gaze (which portion of the touch screen 200, 500 is being viewed) of an aircraft member is determined. As previously mentioned, the flight deck controller includes a gaze tracking controller 132, an emitter 134, and a sensor 136. The emitter 134 is positioned on the head of the user for emitting a signal that is sensed by one or more sensors 136 positioned near the touch screen. The gaze tracking controller 132, in response to the sensed signal, communicates with the touch screen 102 to identify a portion of the touch screen being viewed. In one exemplary embodiment of FIG. 7, the gaze determining system 130 determines that the user is looking at button 208 and activates a region 711 in a position near the button 208 with appropriate offset and orientation. The user may place a digit from the hand 715 (FIG. 8) on the region 711 and then touch button 208. If the region 711 is not close enough to the button 208, the user may drag the region 711 closer to the button 208. When the region 711 overlies a button 201-209, such as region 711 overlying button 209, that portion of the button 209 will not register a touch. Furthermore, the region 711 is semi-transparent, allowing the user to see the button 209 beneath the region 711. When the user is not looking at the touch screen 700 (the touch screen 700 is not in use), the region 711 does not appear.

Figure 9:
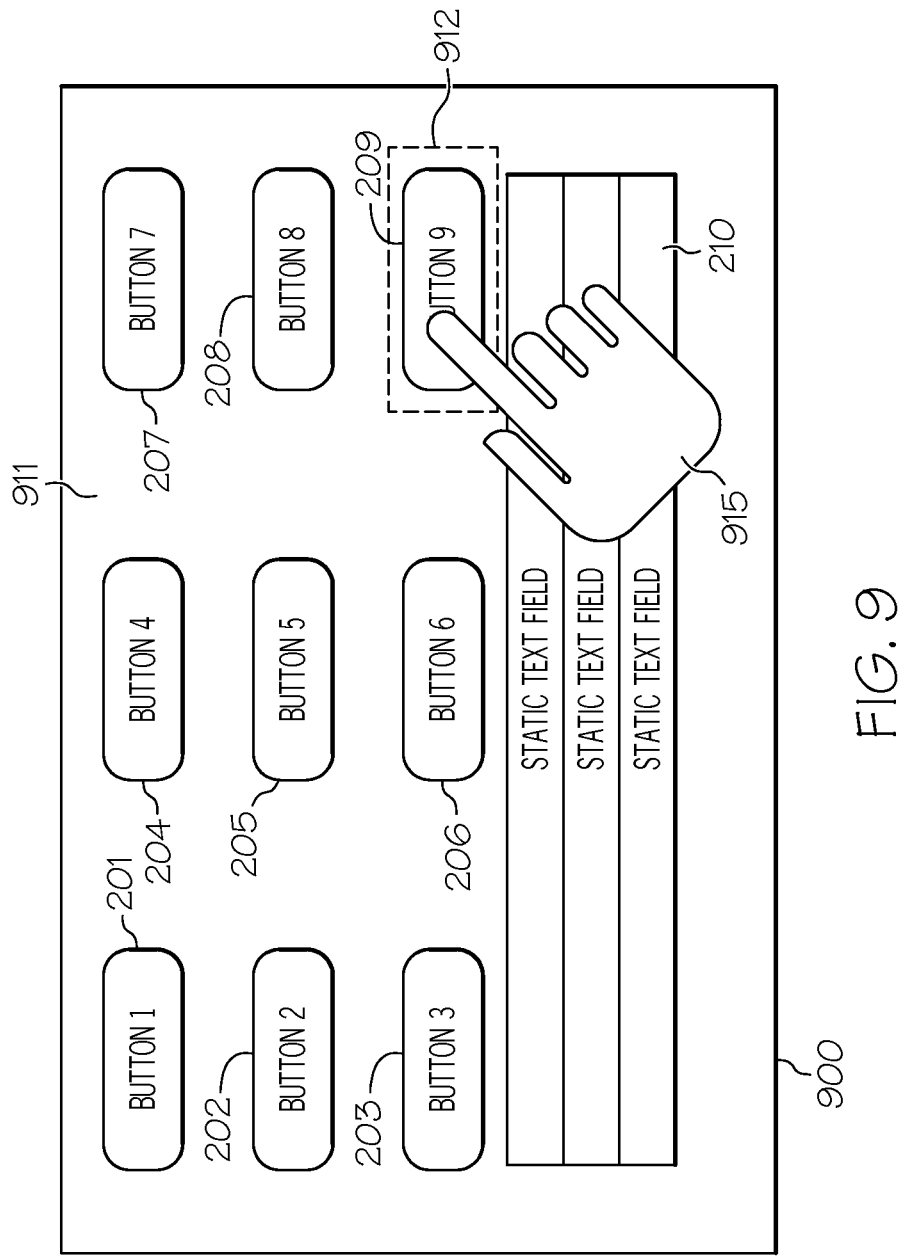
FIG. 9 is a frontal view of a touch screen in accordance with a fourth exemplary embodiment.

In yet another exemplary embodiment of FIG. 9, the gaze determining system 130 determines that the user is looking at button 209 and activates a sensing area 912 around the button 209 and a region 911 (that prevents a touch from being registered) for the remainder of the touch screen 900. The user may place a digit, e.g., a thumb, a palm, or the like, from the hand 915 anywhere on the region 911 (anywhere on the touch screen 900 except for in the sensing region 912) and then touch button 209 with a digit. The boundary of the sensing area 912 may be displayed around a single or a group of graphical objects (buttons to indicate the augmented touch sensitive area corresponding to the gaze. For example, if the gaze target contains closely placed buttons like numeric entry or a keypad, the boundary would be displayed such that it surrounds all of the graphical objects.

Figure 10:
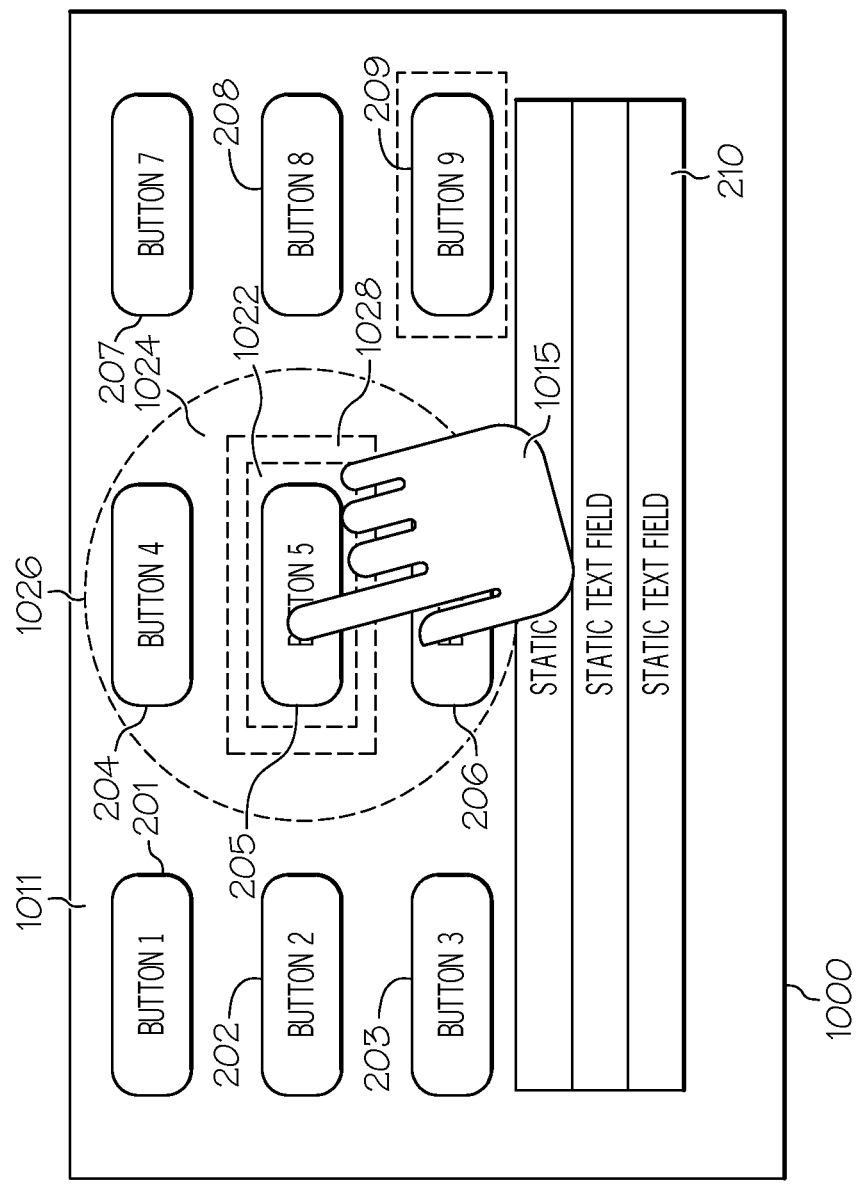
FIG. 10 is a frontal view of a touch screen in accordance with a fifth exemplary embodiment.

In still another exemplary embodiment (FIG. 10), a manual method is provided for selecting, relocating, and resizing a touch sensitive zone 1022 for selecting one of the buttons 201-209 on the touch screen 1000. A viewport 1024 having an outer boundary 1026 and an inner boundary 1028 encompasses the touch sensitive zone 1022. The area outside the viewport 1024 is a region 1011. The viewport 1024 may be manually instantiated, for example, by menu selection. The viewport 1024 defines a touch sensitive area that may be used for moving and resizing the viewport 1024. The user may place a digit, e.g., a thumb, a palm, or the like, from the hand 1015 anywhere on the region 1011 (anywhere on the touch screen 1000 except for within the outer boundary 1026 of the viewport 1024) and then touch button 205 with a digit. When the region 1011 overlies a button 201-209, such as region 1011 overlying buttons 201-203, 207-209, that portion of the button will not register a touch. Furthermore, the region 1011 is semi-transparent, allowing the user to see the buttons 201-203, 207-209 beneath the region 1011. Likewise, the viewport 1024 is semi-transparent, allowing the user to see the buttons 204-206 beneath the viewport 1024.

Figure 11:
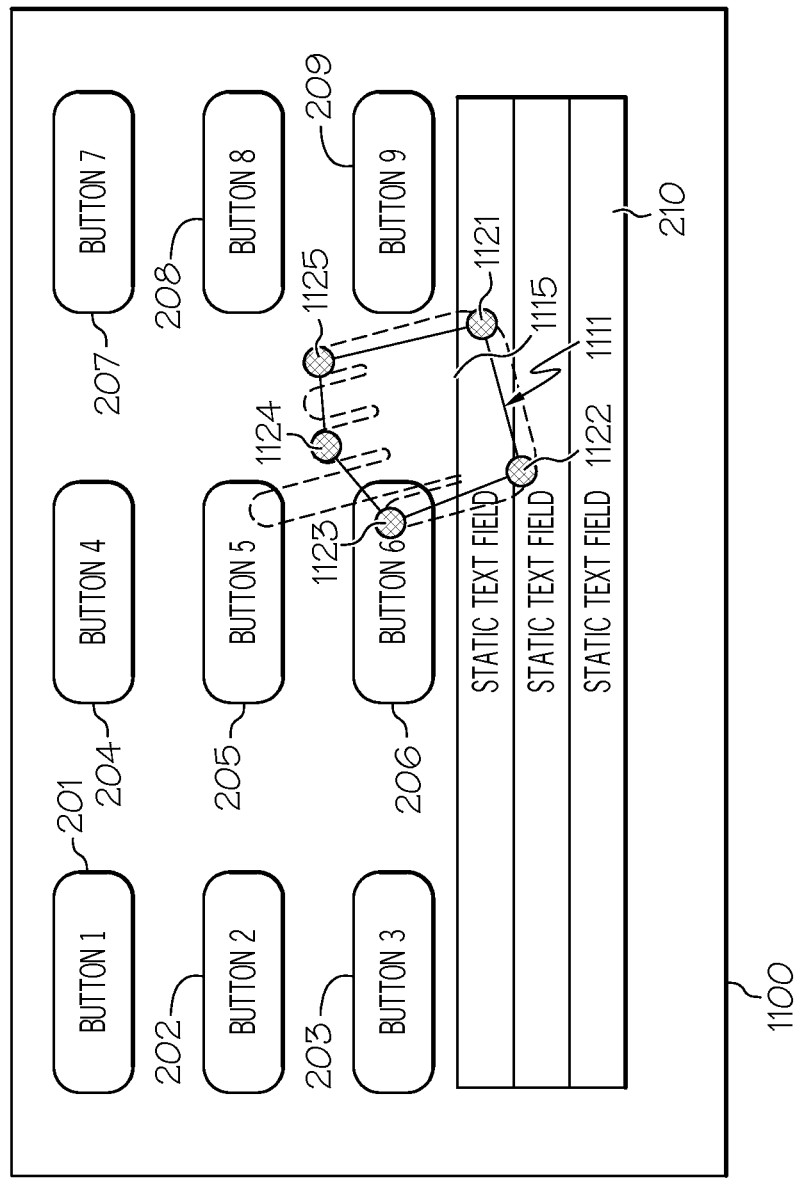
FIGS. 11-12 are frontal views of a touch screen in accordance with a sixth exemplary embodiment.
Figure 12:
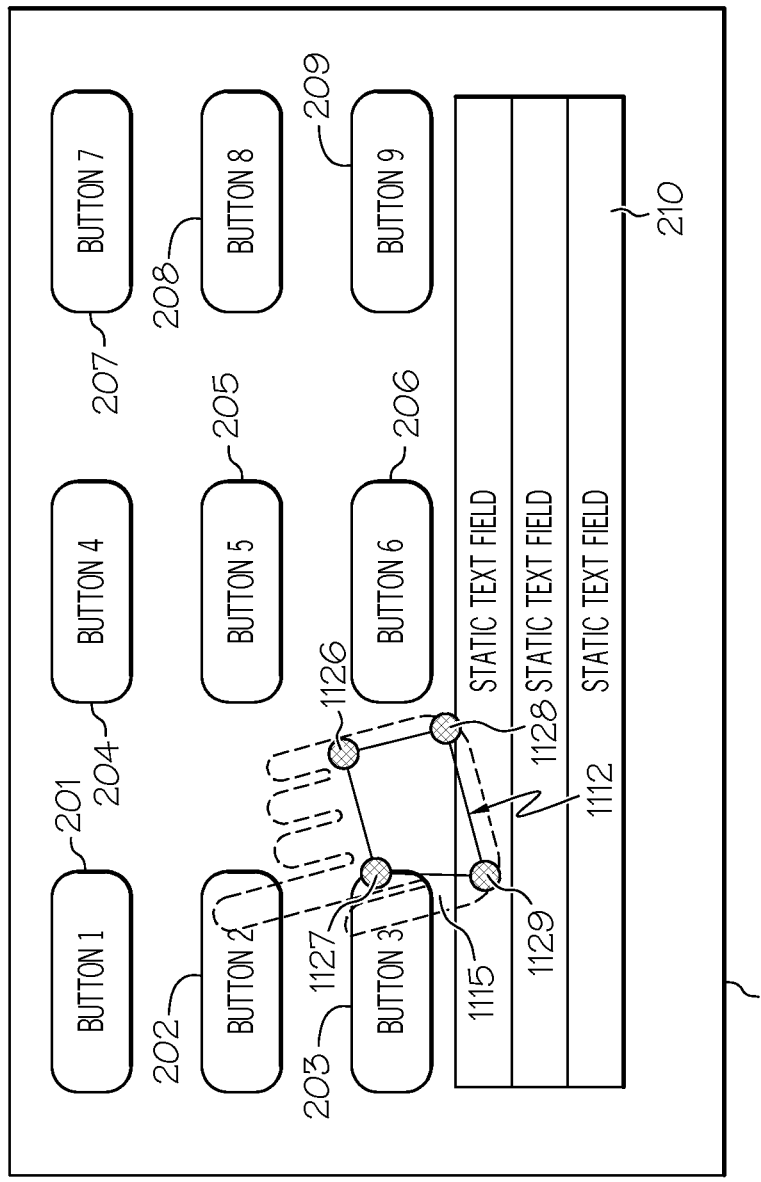

When the user places a hand 1115 (dotted for illustration) on the touch screen 1100 for the exemplary embodiment of FIG. 11, touch points 1121-1125 are determined and a polygonal region 1111 is defined. The user may drag the hand 1115 (FIG. 12) causing a new polygon region 1112 defined by the touch points 1125-1129 to where the user may touch the button 202, for example. When the region 1111 overlies a button 201-209, such as region 1111 overlying button 206, that portion of the button 206 will not register a touch. Furthermore, the region 1111, 1112 is semi-transparent, allowing the user to see the buttons 206, 203 beneath the region 1111, 1112.

Figure 13:
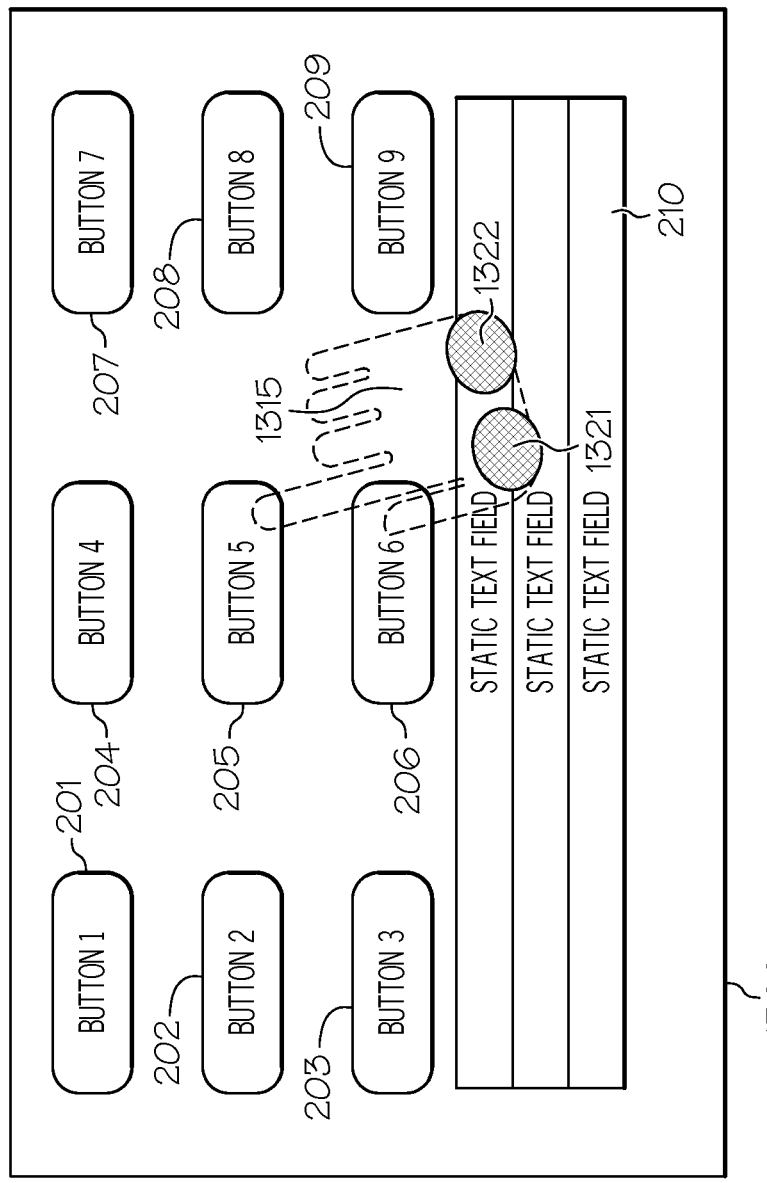
FIGS. 13-14 are frontal views of a touch screen in accordance with a seventh exemplary embodiment.
Figure 14:
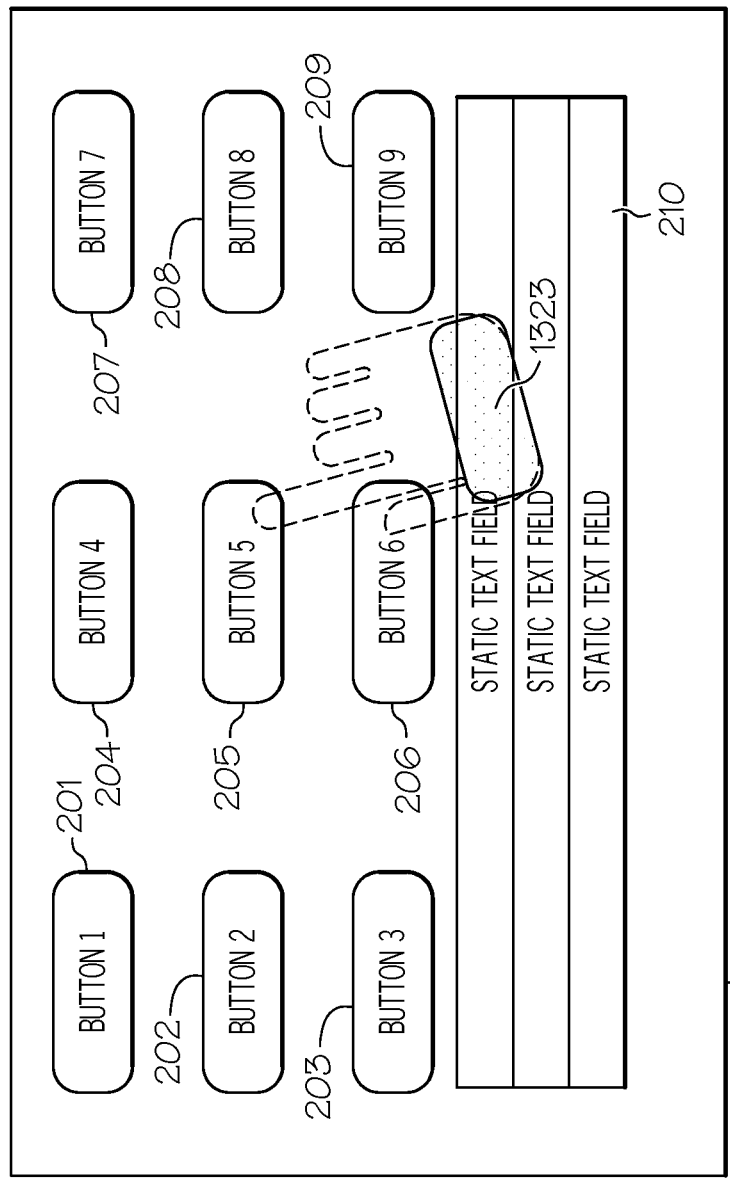

In another exemplary embodiment of FIGS. 13-14, the touch screen 1300 may sense two or more separate areas of the hand 1315 (dotted for illustration) placed on the touch screen 1300, thereby creating two or more regions 1321, 1322, and then combine these two or more regions 1321, 1322, including the area of the touch screen between the two or more areas, to form a combined single region 1323.

Figure 15:
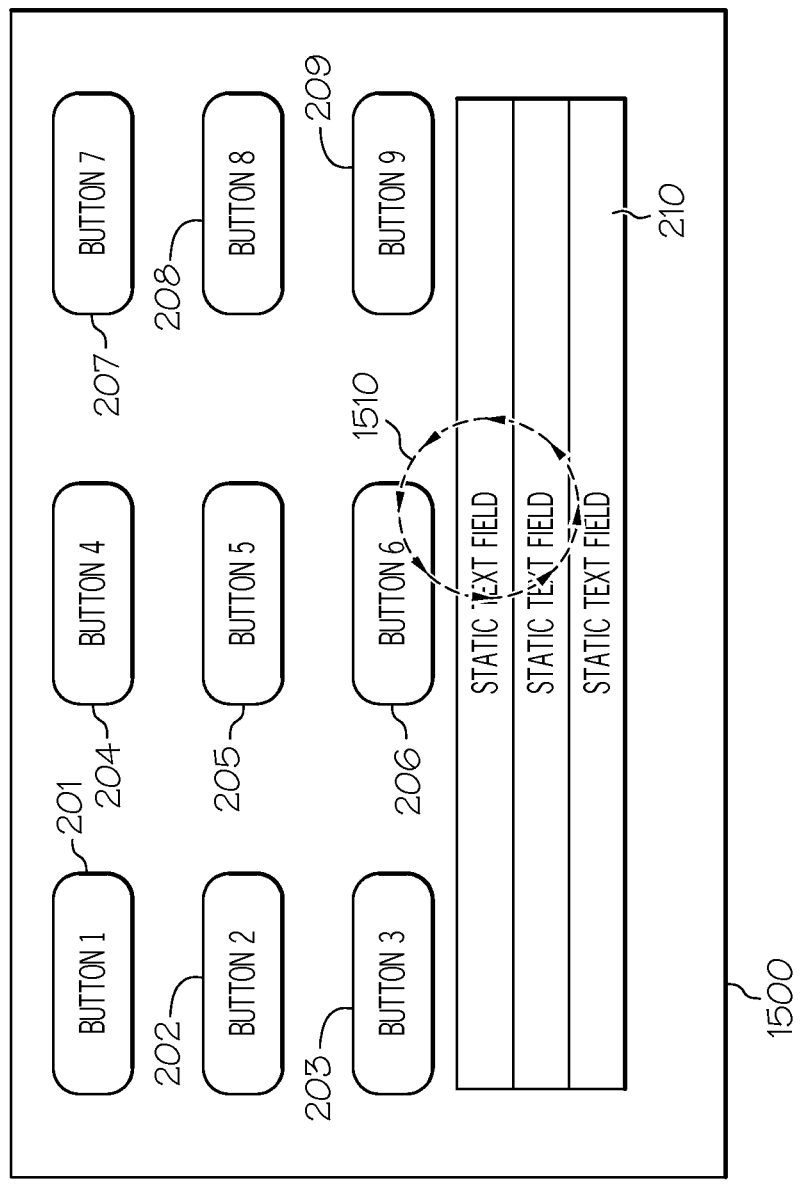
FIGS. 15-16 are frontal views of a touch screen in accordance with an eight exemplary embodiment.
Figure 16:
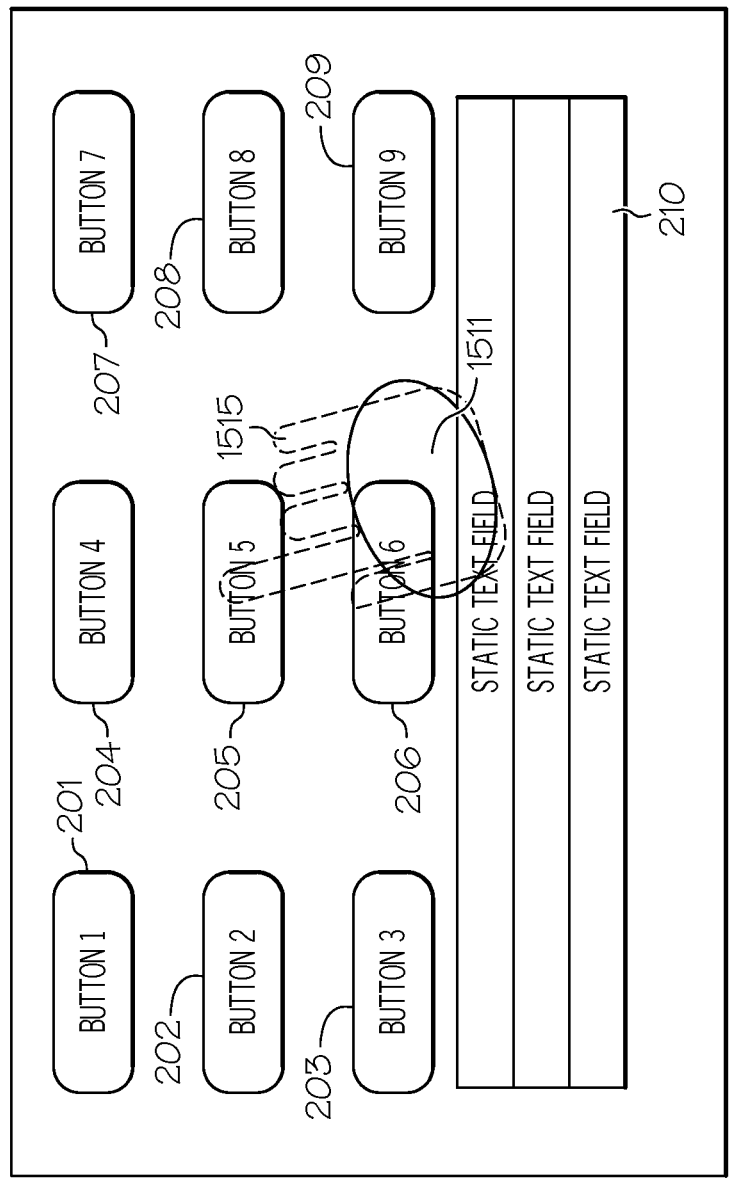

Referring to FIGS. 15 and 16, the user creates a region 1511 by making a gesture 1510 on the touch screen 1500. The gesture 1510, for example a circular motion by a finger, may comprise any size or shape, and may be drug across the touch screen 1500 by the user to provide access to any of the buttons 201-209, for example, button 205 in FIG. 16.

FIGS. 17 and 18 are flow charts that illustrate exemplary embodiments of a touch screen 107 suitable for use with a flight deck system 100. Processes 1700 and 1800 represent two implementations of a method for stabilizing the hand for touching a desired button on an onboard display element of a host aircraft. The various tasks performed in connection with process 1700, 1800 may be performed by software, hardware, firmware, or any combination thereof. For illustrative purposes, the following description of processes 1700, 1800 may refer to elements mentioned above in connection with the figures. In practice, portions of processes 1700, 1800 may be performed by different elements of the described system, e.g., a processor, a display element, or a data communication component. It should be appreciated that processes 1700, 1800 may include any number of additional or alternative tasks, the tasks shown in FIGS. 17, 18 need not be performed in the illustrated order, and processes 1700, 1800 may be incorporated into a more comprehensive procedure or process having additional functionality not described in detail herein. Moreover, one or more of the tasks shown in FIGS. 17, 18 could be omitted from an embodiment of the process 1700, 1800, respectively, as long as the intended overall functionality remains intact.

Referring to FIG. 17, the method includes preventing 1702 at least one button on a first portion of the touch screen from registering a touch; sensing 1704 a portion of a hand on the first portion; and sensing a touch 1706 of another of the plurality of buttons on a second portion of the touch screen.

The method of FIG. 18 includes preventing 1802 a first portion of the touch screen from registering a touch, and sensing 1804 a touch to one of the plurality of buttons within a second portion of the touch screen While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method of selecting one of a plurality of buttons displayed on a touch screen, each of the buttons configured to select an associated function of a plurality of functions, comprising:
   determining a location of a region on a display in consideration of the location of the buttons;
   displaying the region, the region preventing a sensing by one or more of the buttons by a positioning by a first portion of a user's hand on the region over the one or more buttons; and
   sensing the touch of a second portion of the user's hand on one of the buttons not affected by the region to select the associated function of that button while the first portion of the user's hand is positioned on the region.

2. The method of claim 1 further comprising a plurality of regions on the touch screen whose locations are based on the location of the plurality of buttons, and the positioning of the first portion of the user's hand comprises:
   sensing the first portion on the region.

3. The method of claim 1 further comprising:
   sensing a gaze at one of the buttons; and
   placing a region on the touch screen based on the location of the button for which the gaze was directed.

4. The method of claim 1 further comprising:
   sensing a gaze at a desired button for selection; and
   deactivating at least one other button from sensing a touch.

5. A method of selecting one of a plurality of buttons displayed on a touch screen, comprising:
   determining a location of a region on a display in consideration of the location of the buttons;
   displaying a region, the region preventing a sensing by one or more of the buttons by a positioning of a first portion of a user's hand on the region over the one or more buttons; and
   sensing the touch of a second portion of the user's hand on one of the buttons not affected by the region while the first portion of the user's hand is positioned on the region.

6. The method of claim 5 wherein the preventing step comprises:
   providing a plurality of regions on the touch screen whose locations are based on the location of the plurality of buttons; and
   sensing a portion of a hand on one of the plurality of regions.

7. The method of claim 6 further comprising:
   sensing the movement of one of the regions.

8. The method of claim 7 further comprising:
   changing the shape of the region during the movement.

9. The method of claim 8 further comprising:
   changing the region to its shape prior to the movement when the movement has ceased.

10. The method of claim 5 wherein the preventing step comprises:
    providing a region of a size sufficient to receive a palm of a hand.

11. The method of claim 5 further comprising:
    determining a button at which a user is gazing; and
    placing a region on the touch screen based on the location of the button for which the gaze is directed.

12. The method of claim 5 further comprising:
    determining a button at which a user is gazing; and
    deactivating at least one other button from sensing a touch.

13. The method of claim 5 further comprising:
    determining a button at which a user is gazing; and
    defining a viewport surrounding the desired button.

14. The method of claim 13 further comprising:
    moving the viewport by the application of a moving touch.

15. The method of claim 5 wherein the preventing step comprises:
    sensing a touch of the touch screen to define a plurality of touch points that define a region.

16. The method of claim 5 further comprising:
    sensing the movement of the hand to change the location and shape of the region.

17. The method of claim 5 wherein the preventing step comprises:
    sensing a gesture of a user to define a region.

18. A touch screen comprising:
    a display screen;
    first circuitry configured to display at least one character through the display screen on each of a plurality of buttons; and
    second circuitry configured to sense touches applied to each of the plurality of buttons; and
    a processor configured to:
       display a region in which a touch by a first portion of a user's hand to at least a portion of an underlying button will be ignored;
       determining a location of the region on the display screen in consideration of the location of the buttons;
       wherein the sensing of touches of a second portion of the user's hand as applied to each of the plurality of buttons is not affected by the region while the first portion of the user's hand is positioned on the region.

19. The touch screen of claim 18 wherein the processor is further configured to:
    determine the location of the region based on the location of the plurality of buttons.

20. The touch screen of claim 18 wherein the processor is further configured to:
    determine a button at which a user is gazing; and
    place a region on the touch screen based on the location of the button for which the gaze is directed.

21. The touch screen of claim 18 wherein the processor is further configured to:
    determine a button at which a user is gazing; and
    preventing at least one other button from sensing a touch.

* * * * *